United States Patent [19]

Jahnel

[11] Patent Number: 4,501,548

[45] Date of Patent: Feb. 26, 1985

[54] LABEL TRANSFERRING DEVICE FOR BLOW MOLDING MACHINES

[75] Inventor: Werner F. F. Jahnel, Haslett, Mich.

[73] Assignee: Bekum Plastics Machinery Inc., Williamston, Mich.

[21] Appl. No.: 514,869

[22] Filed: Jul. 18, 1983

[51] Int. Cl.³ .............................................. B29C 17/07
[52] U.S. Cl. .................................... 425/503; 264/509; 425/504; 425/183; 425/186; 425/522; 425/538
[58] Field of Search ................ 264/509; 425/503, 183, 425/504, 186, 522, 538

[56] References Cited

U.S. PATENT DOCUMENTS

| | | |
|---|---|---|
| 1,157,660 | 10/1915 | Coates . |
| 1,165,936 | 12/1915 | Becker . |
| 1,282,700 | 10/1918 | Knapp et al. . |
| 1,445,745 | 2/1923 | Burke . |
| 1,551,847 | 9/1925 | Riley . |
| 1,744,438 | 1/1930 | Benson . |
| 2,106,864 | 2/1938 | Balton . |
| 2,601,700 | 7/1952 | Pinsky et al. . |
| 2,767,873 | 10/1956 | Whitecar . |
| 2,864,522 | 12/1958 | Tuthill . |
| 3,072,969 | 1/1963 | DuBois . |
| 3,108,850 | 10/1963 | Brandt . |
| 3,151,193 | 9/1964 | Thornton ............................ 264/509 |
| 3,194,857 | 7/1965 | White . |
| 3,207,822 | 9/1965 | Makowski . |
| 3,227,787 | 1/1966 | Battenfeld . |
| 3,267,186 | 8/1966 | Battenfeld . |
| 3,272,681 | 9/1966 | Langecker ........................... 264/509 |
| 3,287,198 | 11/1966 | Battenfeld . |
| 3,292,209 | 12/1966 | Borkmann . |
| 3,380,121 | 4/1968 | Chittenden et al. . |
| 3,417,175 | 12/1968 | Brown et al. . |
| 3,430,292 | 3/1969 | Bauman et al. ...................... 425/183 |
| 3,434,902 | 3/1969 | Bliss . |
| 3,438,085 | 4/1969 | Larkin . |
| 3,474,498 | 10/1969 | Hoppes . |
| 3,503,826 | 3/1970 | Nasica . |
| 3,510,341 | 5/1970 | Peck et al. . |
| 3,518,335 | 6/1970 | Jablonski . |
| 3,558,197 | 12/1970 | Szajna et al. . |
| 3,559,248 | 2/1971 | Stockmann . |
| 3,608,020 | 9/1971 | Langecker . |
| 3,632,252 | 1/1972 | Amberg et al. . |
| 3,657,405 | 4/1972 | Langecker . |
| 3,770,860 | 11/1973 | Amberg et al. . |
| 3,801,689 | 4/1974 | Langecker . |
| 4,035,222 | 7/1977 | Amberg . |
| 4,082,487 | 4/1978 | Rapp .................................. 425/183 |
| 4,163,686 | 9/1979 | Risi . |
| 4,233,262 | 11/1980 | Curto . |
| 4,287,150 | 9/1981 | Gendron . |
| 4,289,817 | 9/1981 | Valyi . |
| 4,306,926 | 12/1981 | Pfulb . |
| 4,307,058 | 12/1981 | Morello et al. . |
| 4,323,411 | 4/1982 | Uhlig . |
| 4,335,635 | 6/1982 | Hautemont . |
| 4,339,409 | 7/1982 | Curto . |
| 4,355,967 | 10/1982 | Hellmer . |
| 4,359,314 | 11/1982 | Hellmer . |

*Primary Examiner*—Jan Silbaugh
*Assistant Examiner*—Hubert C. Lorin
*Attorney, Agent, or Firm*—Price, Heneveld, Huizenga & Cooper

[57] ABSTRACT

A label transferring device for blow molding machines which includes a sliding mold insert with a plurality of label carrying segments which are shifted into an access aperture communicative with the mold cavity. As the insert is shifted, each label carrying segment cooperates with the mold to form the cavity. A label transfer arm assembly removes a label from a supply magazine and places the label on one exposed label carrying segment while another label carrying segment is within the mold cavity undergoing the molding and label attachment process.

19 Claims, 9 Drawing Figures

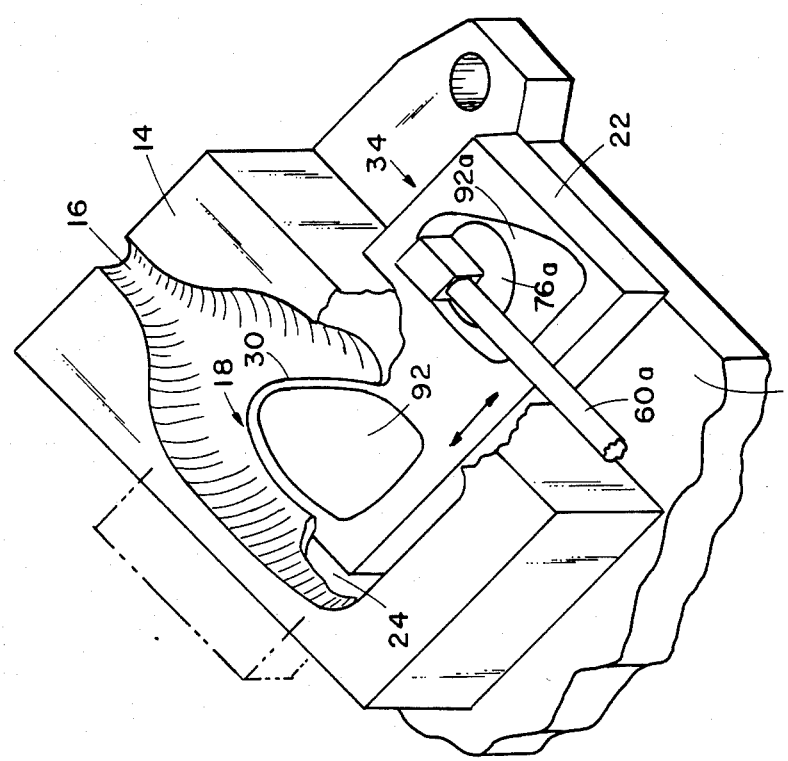
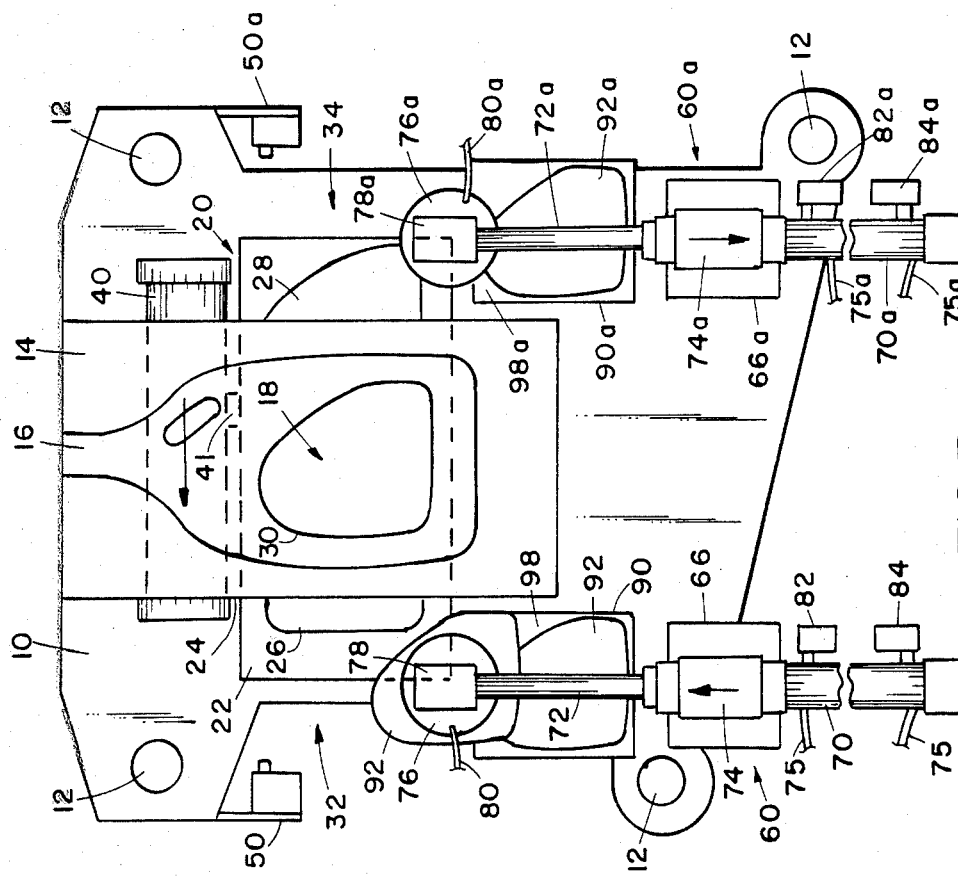

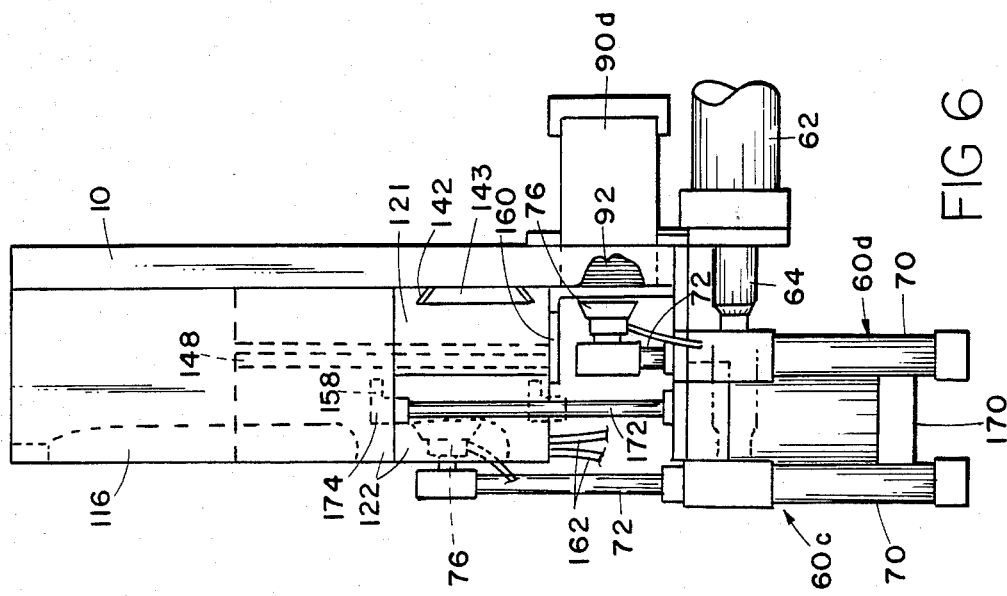
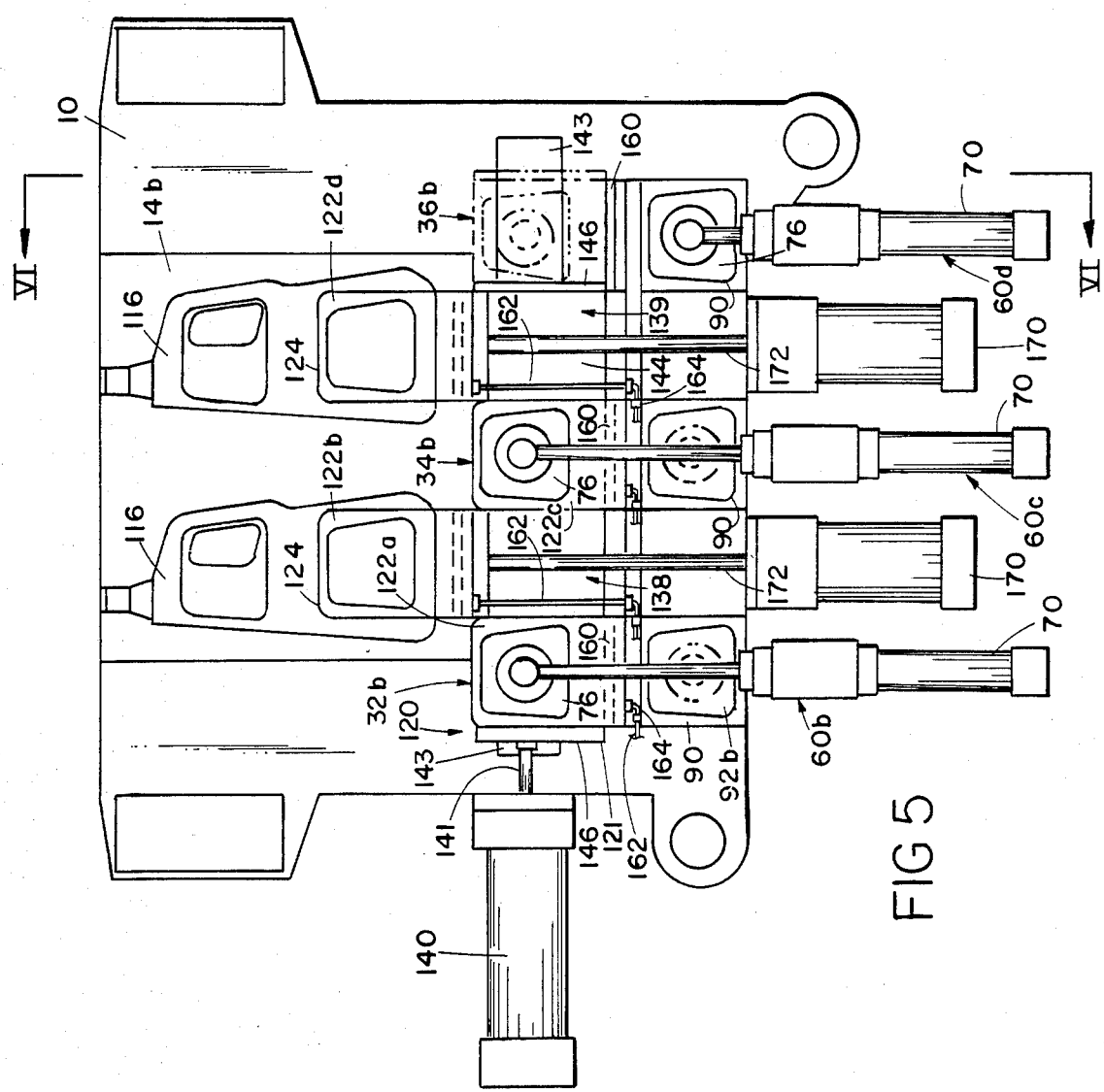

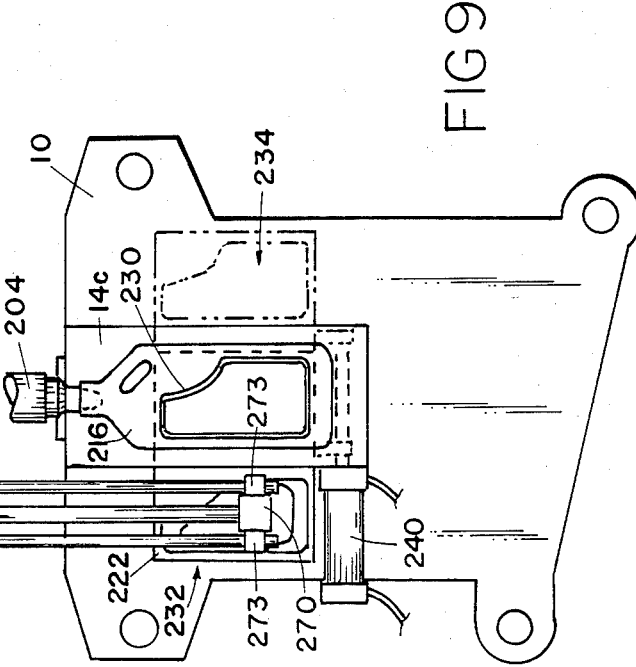
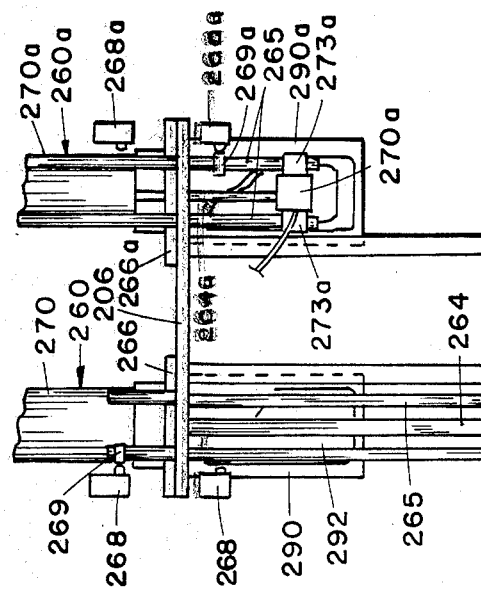
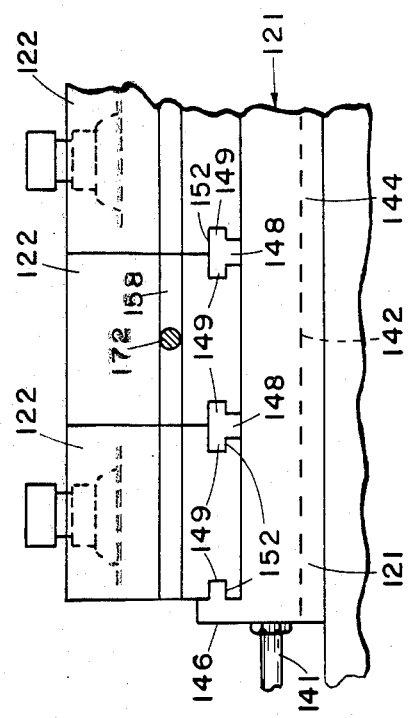
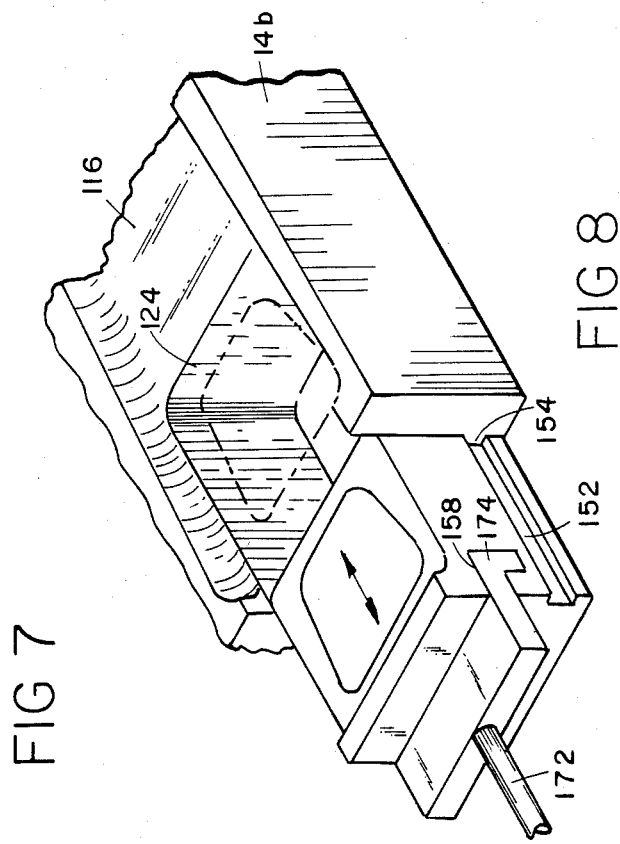

LABEL TRANSFERRING DEVICE FOR BLOW MOLDING MACHINES

BACKGROUND OF THE INVENTION

The present invention relates to in-mold labeling and in particular to label transferring devices for blow molding machines having separable molds.

Blow molding machines are well known in the art and have various designs, many of which employ a pair of moving platens on which are mounted a pair of separable mold sections which define the mold cavity. In such blow molding machines, the molding material is extruded or otherwise formed, the mold sections being separated by the platens in order to encircle the molding material parison. The mold sections are then brought together by the movable platens and the parison, typically after the platens and the closed mold sections carried thereby have been moved to a so-called calibration station, is blown to form the desired object, such as a container or the like.

It is desirable, particularly where the articles being blow molded are soap containers or the like, to thermoplastically adhere the labels to the containers during the blow molding process. This involves placing a pre-printed label within one or both of the mold sections prior to the closing of the sections about the parison and the subsequent blowing procedure. Labels so adhered to the containers, as will be readily appreciated by those skilled in the art, have distinct advantages over post-molding applied labels. First and foremost, of course, in-mold labeling avoids the necessity of conducting a subsequent labeling process. Second, and nearly equally important, in-mold applied labels are much more resistant to abrasion such as is incurred in filling operations, shipment and the like. In-mold applied labels in general make for a more attractive packaging of the particular product.

In-mold labeling is not, however, without disadvantages. In the platen-type machines described heretofore, the time required to place the label within the mold after the previously molded container has been ejected reduces significantly the output of a given machine. In this inventor's co-pending application, entitled Blow Molding Label Transferring Device, Ser. No. 515,033, filed on even date herewith, the disclosure of which is hereby incorporated by reference, a system is disclosed and claimed which has the potential of reducing this time lapse. The instant invention, while perhaps more complicated from a mechanical standpoint, reduces this time lapse to virtually zero, permitting the platen-type machine to incorporate the in-mold labeling concept with virtually no loss in production capacity.

SUMMARY OF THE INVENTION

The present invention is embodied in a label transferring device for blow molding machines having separable mold sections which define a mold cavity, at least one mold section includes a sliding mold insert which has at least two label carrying mold segments. When the insert is slid into the mold section, one of the label carrying segments is exposed to the mold cavity and cooperates with the two mold sections to fully define the mold cavity, while the other of the label carrying segments remains accessible from the exterior of the mold. A shifting assembly shifts the movable insert from one position to another so that the label carrying segments are alternately moved into the mold cavity and exposed outside of the mold. A label transfer assembly alternatingly transfers labels from a label supply to each of the exposed label carrying segments so that one of the segments has a label placed thereon while the other forms a part of the mold and applies the label during the blowing process.

Since one label carrying segment is exposed whenever another label carrying segment is in the mold, the machine is not required to wait for placement of the next label, and the time for each cycle of the machine is reduced to a point equal or nearly equal to that which can be achieved without concern for in-mold labeling. Additionally, the label transfer assembly may be mounted on the platens to move along with the mold sections and moving insert. With such an arrangment, a label can be placed on the exposed label carrying segment while the platens are moved from one station of the blow molding machine to another. More importantly, perhaps, the label can be transferred to the exposed label carrying segment while the mold sections are closed. This permits the mold sections to be closed about a parison and be moved to the calibration station, at which the bottle is blown while a new label is being simultaneously placed, regardless of whether the label transfer assembly is mounted on the platen or the machine frame.

These and other objects or aspects of the invention will be recognized by the following description, claims and drawings herewith.

BRIEF DESCRIPTION OF THE DRAWINGS

FIG. 3 is a front plan view of the platen label transferring assembly of FIG. 1, shown with the label transferring assembly intermediate the steps of applying a new label;

FIG. 4 is a fragmentary, perspective view of the mold section, slidable insert and transfer mechanism of FIG. 1 partially broken away;

FIG. 5 is a front-elevational view of a second embodiment of the present invention, showing a blow molding machine rear platen with a multiple cavity mold section and label transferring device mounted thereon, taken along the median line between the two separated platens of the machine;

FIG. 6 is a side-elevational, fragmentary view of the platen, label transferring assembly shown in FIG. 5 taken along plane VI—VI;

FIG. 7 is a fragmentary, bottom plan view of the mold inserts and slide carriage used to shift the inserts;

FIG. 8 is a fragmentary, perspective view of one mold insert and the mold cavity insert area of the embodiment shown in FIGS. 5-7; and FIG. 9 is a fragmentary, front plan view of a third embodiment of the invention, showing a blow molding machine rear platen at the calibration station of the machine and a stationarily mounted label transferring device.

DETAILED DESCRIPTION OF THE PREFERRED EMBODIMENTS

Figure 2:
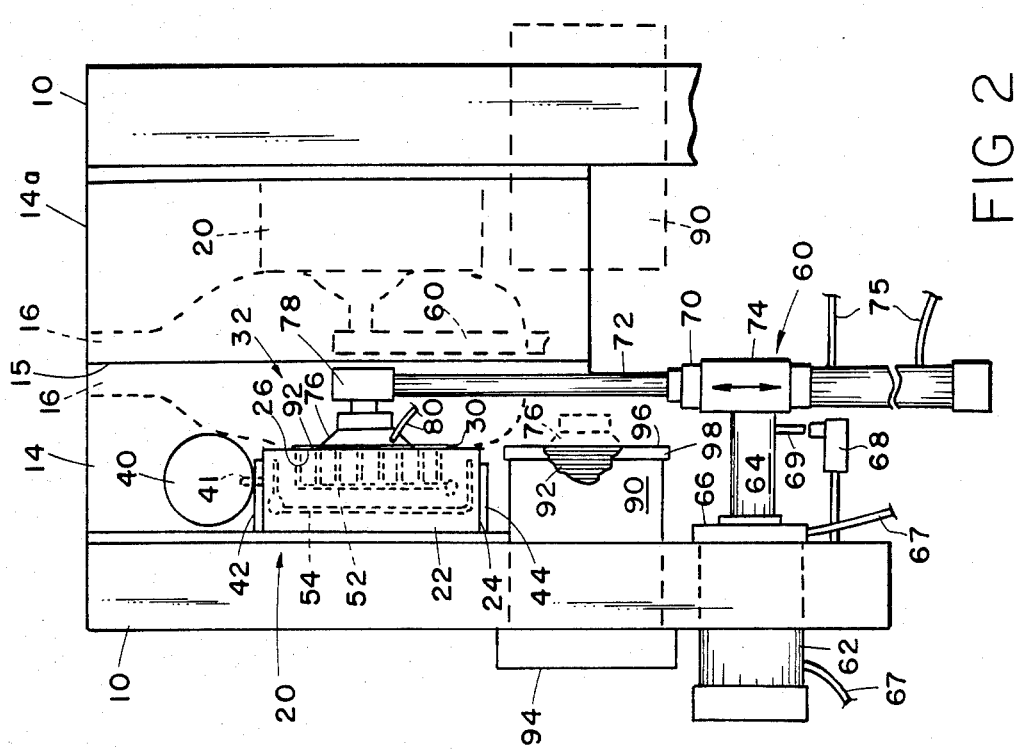
FIG. 2 is a side-elevational, fragmentary view of the platen, label transferring assembly shown in FIG. 1 taken along plane II—II, showing the platens and mold sections in a closed position and a label being transferred.

In the preferred embodiments, a blow molding machine for which this invention is particularly adaptable has a pair of spaced, movable platens, referenced throughout the drawings as 10, and on which are mounted a mating pair of mold sections 14, 14a, 14b, 14c which define the mold cavity 16, 116 and 216. A sliding mold insert assembly slides into mold section 14 so as to be between mold cavity 16 and the platen 10 by which it is supported, with the exception of a label carrying segment which is configured to mate with an opening in the mold cavity and to form a part of the mold during the blowing process. The sliding insert assembly has two or more of these label carrying segments so that one such label carrying segment can carry a label into the mold cavity and form a part of the cavity during the blowing process, while another label carrying segment can have a label placed thereon at the same time. A set of transfer arm assemblies and label supplies is mounted on the platens 10 in accordance with the embodiment of FIGS. 1-8 or on the frame in accordance with the embodiment of FIG. 9, each transfer arm assembly being adapted to place a new label from its label supply onto a label carrying segment while the segment is exterior the mold.

In the embodiment shown in FIGS. 1-4, mold sections 14 have one mold cavity and two transfer arm assemblies 60. In the embodiment shown in FIGS. 5-8, platens 10 carry mold sections 14b which include a pair of mold cavities 116. A set of three label transfer arm assemblies 60 are mounted on platen 10b in this embodiment. In the embodiment shown in FIG. 9, mold sections 14c have a single cavity 216, while a pair of label transfer arm assemblies 260 are stationarily mounted at the calibration station on the frame of the blow molding machine.

Figure 1:
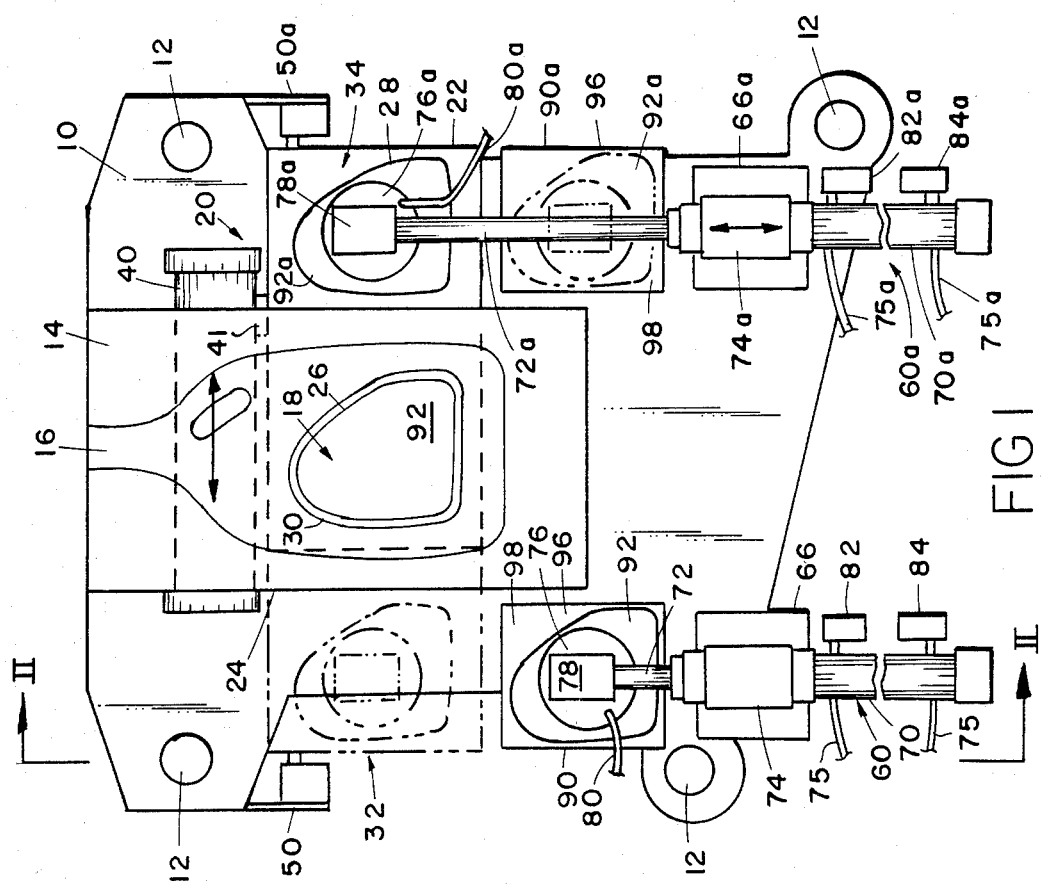
FIG. 1 is a front-elevational view of a blow molding machine rear platen with a single cavity mold section and label transferring device mounted thereon embodying the present invention, taken along the median line between the two separated platens of the machine.

As shown in FIG. 1, platens 10 are generally planar and have a set of tie rod mounts 12 which are used to slidably carry platens 10 on the blow molding machine, as is conventionally known in the art. Mounted on each platen 10 are mating sections 14 and 14a which separate and converge as platens 10 move toward and away from one another on the tie rods. Platens 10 incorporate a cooling system (not shown) which includes an array of ducts and coupling hoses that communicate with a similar cooling system in the mold. The system cools the mold during the blowing process. Platens 10, typically, will be used in a multi-station blow molding machine in which they are moved from one blow molding station to another within the machine. Exemplary is the so-called extrusion station, where the molds pick up the parison, and the calibration station, where the parison is blown.

Mold sections 14 contact each other along a part line 15, FIG. 2, which defines a bifurcating plane between platens 10. Each mold section 14 includes half of a mold cavity 16 which is configured to provide the shape of the desired object being molded.

EMBODIMENT OF FIGS. 1-4

In the embodiment shown in FIGS. 1-4, a label transferring device 1a is used with a mold having sections 14 and 14a which will mold a single bottle in one cycle of the blow molding machine. In this embodiment, sliding mold insert assembly 20 includes a single, elongated rectangular insert 22 which slides in a linear channel 24 that opens out to opposite sides of mold section 14. On the surface of sliding insert 22, facing away from platen 10, are two spaced label carrying segments 26 and 28 upon each of which a label 92 may be mounted.

At label affixing area 18 in cavity 16 is a mold label aperture 30 which extends from cavity 16 into insert channel 24. Area 18 is configured to mate with label carrying segments 26 and 28. Label carrying segments 26 and 28 each will be alternatingly exposed to cavity 16 when it is positioned in abutment with affixing area 18, as shown in FIG. 1. When either of label carrying segments 26, 28 is so positioned in label aperture 30, it cooperates with mold section 14 to define cavity 16. Sliding insert 22, therefore, must be held in tight abutment with mold section 14 to prevent leakage therearound. Due to this tight abutment, label carrying segments 26 and 28 must be at least slightly recessed into sliding insert 22 to permit the label mounted on insert 22 to pass through channel 24.

On either side of mold section 14 adjacent the opening for mold channel 24 is a labeling station 32, 34. When one of label carrying segments 36, 28 is positioned in mold label aperture 30, the other segment will be positioned at either labeling station 32 or 34, FIGS. 1, 4. Labeling stations 32 and 34 are the locations at which a label 92 is placed on label carrying segments 26, 28.

Insert assembly 20 includes a double-acting hydraulic cylinder 40, FIGS. 1, 3, which extends parallel to one side of mold channel 24 and is mounted within mold section 14 between mold cavity 16 and platen 10. Hydraulic cylinder 40 is connected to sliding insert 22 by an arm 41 which shifts insert 22 back and forth as cylinder 40 is actuated in alternating directions. Arm 41 extends through the side wall of cylinder 40 and is shifted by the cylinder mechanism under the influence of properly valved fluid, as is conventionally known in the art. Arm 41 extends through a slotted track bearing 42, FIG. 2, which provides a bearing surface against which insert 22 slides. Located on the opposite side of insert 22 is a corresponding track bearing 44.

Mounted on platen 10 and positioned on the outer side of each labeling station 32, 34 is a slide limit switch 50, 50a, FIGS. 1, 3. These switches sense the position of sliding insert 22 and control operation of transfer arm assemblies 60. Specifically, the tripping of switch 50a indicates that label carrying segment 26 is in position within the mold and label carrying segment 28 is ready to receive a new label. Tripping of switch 50 indicates that label carrying segment 28 is in position within the mold and label carrying segment 26 is ready to receive a new label.

Extending internally to insert 22 is a vacuum supply network of ducts and ports 52, FIG. 2, which function to secure the label in proper position on label carrying segment 26. Also within insert 22 is a network of cooling water ducts 54 which function to cool insert 22 during the blowing process. Both vacuum network 52 and cooling network 54 are supplied from a vacuum and a cooling water source (not shown) as is conventionally known, such as by flexible hoses or the like.

Mounted to the sides and below mold section 14 on platen 10 at labeling stations 32 and 34 are transfer arm assemblies 60 and 60a, FIGS. 1, 3. Since the two transfer arm assemblies 60, 60a are the same in all pertinent respects except for location, only transfer assembly 60 is described in detail.

A spacing hydraulic cylinder 62, FIG. 2, is mounted through platen 10 and has a nonrotating piston rod 64 that extends away from the surface of platen 10 on which mold section 14 is mounted. Cylinder 62 is mounted to platen 10 by conventional means, such as a mounting bracket 66. Cylinder 62 is a double-acting hydraulic cylinder so as to positively activate piston rod 64 in either direction and is controlled by a valved hydraulic fluid supply 67 as is conventionally known in the art. A limit switch 68 mounted on platen 10 is tripped by an adjustable lobe 69 when piston rod 64 is fully retracted.

Rigidly mounted on the extending free end of piston rod 64 is a positioning hydraulic cylinder 70, FIGS. 1-3. Cylinder 74 has a nonrotating piston rod 72 that extends toward labeling station 32 and cavity 16 from piston rod 64. Positioning cylinder 70 is mounted on piston 64 by a coupling 74 which may be of any conventional type. Positioning cylinder 70 is also a double-acting oil cylinder which is controlled by a hydraulic fluid supply 75 in conventional fashion.

Rigidly mounted on the extending free end of piston rod 72 by a coupling 78 and extending toward platen 10 is a flexible vacuum cup head 76, FIG. 2. Coupling 78 may mount vacuum head 76 in any conventional fashion, such as by a threaded connection to the free end of rod 72. Vacuum head 76 is supplied with a vacuum from an external vacuum supply (not shown) through a flexible vacuum supply line 80 so as to provide a vacuum within its cup-shaped face. This vacuum allows vacuum head 76 to pick up and carry labels 92 from magazine 90. Mounted on positioning cylinder 70, as schematically illustrated in FIGS. 1 and 3, are limit switches 82 and 84. Switch 82 trips when rod 72 is fully extended. Switch 84 trips when rod 72 is fully retracted. Limit switches 82 and 84 are used to control the activation of spacing cylinder 62 to pick up and place a label. Although in the preferred embodiment rod 72 moves between its fully extended and retracted positions, one skilled in the art will recognize that switches 82, 84 could be used as well to halt rod 72 intermediate its end positions.

Mounted on platen 10 between spacing cylinder 62 and labeling station 32 is a label supply magazine 90, FIGS. 1-3, which carries a supply of labels 92 and is mounted directly to platen 10 such as by a mounting bracket 94, FIG. 2, or the like. Label magazine 90 has an open end 96 about which extends a retaining flange or lip 98 that maintains labels 92 within magazine 90. Magazine 90 has a spring or other mechanism for urging the labels into contact with retaining flange 98, and thus provides continual access to labels 92 through open end 96.

As shown in FIG. 2, label supply magazine 90 extends through platen 10 and therefore provides a stacked supply of labels 92, which may be replenished from the back side of platen 10. Alternatively, a label supply magazine could feed a continuous strip of labels between platen 10 and vacuum head 76. Label magazine 90 is aligned with label placing station 32 so as to position open end 96 immediately adjacent vacuum head 76 when piston rod 72 is fully retracted in order to access labels 92. Label magazine 90 is also spaced to position the next accessible label 92 the same distance from platen 10 as label carrying segment 26 so that locating cylinder 62 requires only a single retracted position, FIG. 2.

As shown in phantom in FIG. 2, another slide assembly 20, transfer arm assembly 60 and label supply magazine 90 may be mounted on the opposite platen 10. These assemblies are used when a label is to be simultaneously placed on both sides of the bottle being formed. Transfer arm assembly 60 remains between part line 15 and platen 10 even when shifting cylinder 62 fully extends rod 64, so the transfer arm assemblies on the different platens do not interfere with each other. Should such interference be experienced, the label magazine openings may be moved closer to the platens, locating cylinder 62 controlled accordingly, and inserts 22 shifted in opposite directions such that the label placement operation takes place simultaneously at either side of the mold.

OPERATION OF THE EMBODIMENT OF FIGS. 1-4

As noted in detail in applicant's previously referenced co-pending application, the vacuum pressure at ports 52 in label carrying segments 26 and 28 is more negative than that at suction heads 76. This permits a label to be transferred from the head to the label carrying segment by merely bringing the components into close proximity with one another, it being unnecessary to interrupt the vacuum supply to the head.

The label transferring device is positioned initially as shown in FIG. 1, transfer arm assembly 60 being fully retracted and transfer arm assembly 60a being fully extended. In this position, with rods 64 retracted, head 76 seizes a label 92 from open end 96 of magazine 90. At the same time, the previously retrieved label carried by head 76a adheres to exposed label carrying segment 28 because of the greater negative pressure at ports 52. Cylinders 62 are then extended, leaving a label in proper position on label carrying segments 28, head 76a empty and a label on head 76.

Simultaneous with the foregoing operations, if desired, the parison contained within the mold cavity 16 can be blown. Since label carrying segment 26, which has had a label placed thereon during the preceding sequence of operations is in position and forms a part of the cavity, the resulting container will have a label properly affixed to one or both sides thereof.

When the mold sections are opened, the container is ejected in any conventional manner. Once this ejection is complete, cylinder 40 is actuated, shifting label carrying segment 28 and the label carried thereby into the mold and label carrying segment 26 to the exterior of the mold as shown in phantom in FIG. 1, where it trips limit switch 50. The resulting signal causes arm 72 to extend from cylinder 70 and arm 72a to retract into cylinder 70a. When the desired positions are reached—i.e., when head 76 is in horizontal registry with label carrying segment 26 and head 76a is in horizontal registry with the next label 92a in magazine 90—limit switches 82 and 84a trip causing cylinders 62 to retract. This retraction causes the label 92 previously removed from magazine 90 to be seized by label carrying segment 26 and the forwardmost label 92a in magazine 90a to be seized by head 76a. Cylinders 62 are then expanded, leaving a label at label carrying segment 26 and a label removably attached to head 76a for the next cycle.

The platens 10, in the interim, previously or subsequently, move the mold sections 14 to the extrusion section, close them around a parison, and deliver them to the calibration station. Once blowing of the container is completed with label carrying segment 28 forming a section of the mold cavity, the process is repeated.

The embodiment of the device of FIGS. 1–4 may also be used with a mold having more than one mold cavity 16. Insert 22 in such an application is elongated to have additional label mounting segments, and additional label transfer arms and label magazines are mounted on each side of mold section 14 to place labels on the additional label mounting segments. Additionally, the platens can carry more than one mold section with a single common elongated insert sliding in the insert channels through all of the mold sections.

EMBODIMENT OF FIGS. 5–8

In a second embodiment, shown in FIGS. 5–8, a label transferring device is used to transfer labels onto two label carrying segments on the sliding insert assembly simultaneously. This label transferring device is to be used with molds which have two cavities 116, FIG. 5, for simultaneously molding two bottles.

Sliding mold assembly 120, FIGS. 5–7, has a sliding carriage 121 which carries four separate label carrying segments 122. Each segment, when positioned within a mold cavity with label attached, forms thereafter a part of the cavity for the next blowing operation.

The label transferring device includes a set of three transfer arm assemblies 60b, 60c and 60d, FIG. 5. These assemblies are identical, basically, to those described in connection with the embodiment of FIGS. 1–4. Each includes a spacing cylinder 62 affixed to the platen, the rod 64 of which carries a placement cylinder 70. Rods 72 of placement cylinders 70 carry label heads 76, all as previously described.

Transfer arm assemblies 60b, 60c, 60d are mounted so as to extend upwardly toward three aligned labeling stations 32b, 34b and 36b which are positioned beneath mold section 14b and aligned with slide carriage 121, FIG. 5. Mold labeling stations 32b, 34b, 36b are spaced sufficiently to permit a label carrying segment 122 to be positioned in each of the two spaces therebetween, the spaces being hereinafter designated as mold inserting stations 138 and 139, FIG. 5. Mold inserting stations 138 and 139 are each aligned with a channel 124 which extends through the bottom of mold section 14b and into each cavity 116, FIGS. 5, 8. Inserting stations 138, 139 are the locations from which separate label carrying mold segments 122 are removed from slide carriage 121 and inserted into the mold cavities 116. Labeling stations 32b and 36b are located beneath and to the outer sides of cavities 116. Labeling station 34b is located beneath and between cavities 116. The mold inserting stations are positioned between these labeling stations.

Mounted beneath and behind each labeling station 32b, 34b, 36b is a label supply magazine 90 of the type described in connection with the embodiment of FIGS. 1–4. Label supply magazines 90 are positioned so that vacuum heads 76 contact an exposed label when placement hydraulic cylinders 70 and locating cylinders 62 are fully retracted, FIG. 6. This permits vacuum heads 76 to access supply magazines 90 and pick up labels 92.

Slide carriage 121, FIGS. 5, 7, has an elongated, rectangular back 144 from the ends of which extend sides 146. Affixed to back 144 are three T-shaped slide guides 14, FIG. 7, which extend parallel to sides 146 and have a pair of side flanges 149 which are spaced above back 144. A side flange 149 extends along either side 146 in order to be used with guides 148 in slidably mounting inserts 122 on carriage 121, but permitting inserts 122 to be slid into mold cavities 116. Carriage 121 is shifted back and forth by a shifting cylinder 140, FIG. 5, which is mounted on platen 10b. The cylinder rod 141 is coupled to one side 146 of carriage 121, FIGS. 5, 7. Hydraulic cylinder 140 is a double-acting oil cylinder which is controlled in a conventional manner by a suitable hydraulic supply. The carriage 121 is slidably borne on dovetail 143 which is affixed to platen 10. Carriage 121 has a mating slot 142 along its back which accommodate dovetail 143.

As shown in FIGS. 7 and 8, label carrying segments or inserts 122 have guide grooves 152 extending along either side which mate with tongues 149 on slide carriage 121. Tongues 149 are brought into selective registry with the tongues 154 in mold cavities 116 as the cylinder 140 is shifted, thus permitting a selected label carrying insert to be shifted upwardly from carriage 121 into the mold cavity to form a part thereof.

Extending along the bottom of each label carrying insert 122 is an L-shaped channel 158, FIG. 8, which is used to move inserts 122 into cavities 116. Channel 158 extends through inserts 122 so that the coupling element of the insert shifting assembly can slide from one insert 122 to another as sliding mold assembly 122 is shifted back and forth. Directly beneath each labeling station 32b, 34b, 36b, abutting carriage 121, is a flange or lip 160 which extends from platen 10b in order to prevent inserts 122 from dropping down off of carriage 121 when at the labeling stations. Mold inserts 122 each have an internal network of cooling ducts through which cooling fluid is circulated, and also contain a network of vacuum apertures which are used to secure labels to the mounting area of inserts 122. These networks of vacuum and cooling ducts are supplied by flexible lines 162 which slide through cornering brackets 164 so as not to interfere with labeling stations 32 or label magazines 90.

A pair of inserting hydraulic cylinders 170, FIG. 5, are mounted on platen 10b between transfer arm assemblies 60. Inserting cylinders 170 are used as a ram to insert and withdraw label carrying inserts 122 into mold channels 124. Cylinder 170 have a piston rod 172 which extends parallel to T-shaped guides 148 on carriage 121 and has an L-shaped head 174, FIGS. 6, 8, which is configured to mate with channel 158 on inserts 122. As shown in FIG. 8, coupling head 174 is located in channel 158. The inserts slide back and forth on heads 174.

OPERATION OF THE FIGS. 5–8 EMBODIMENT

Assume, at the outset of the operation, that carriage 121 is in the position illustrated in FIG. 5, and that inserts having previously had a label applied thereto have been shifted upwardly to form a part of mold cavities 116. Label transfer arm assemblies, having placed a label on inserts 122a and 122c, are first retracted below and beneath the mold so that each occupies the position at which assembly 60d is illustrated in FIG. 6. This step is necessary, of course, only if the mating mold section, not shown, also carries a labeling system of the type illustrated such that the bottles are being labeled on both sides. Should such not be the case, clearance will exist to retract assemblies 60b and 60c to their label magazine contact positions after the mold has been closed and the blowing operation is in process. In either event, the next step is the closing of the mold around the parisons, transfer to the calibration station and the blowing of the containers.

As the containers are blown, the label held by vacuum on inserts 122b and 122d will permanently adhere thereto. Once blowing has been completed, the mold is opened and the finished containers removed in any conventional fashion.

Cylinders 170 are next retracted, carrying now empty inserts 122b and 122d back into alignment with inserts 122a and 122c in carriage 121. Cylinder 140 is then extended, pushing carriage 121 to the right as viewed in FIG. 5. During this movement, the L-shaped grooves 158 along the bottoms of inserts 122b and 122d permit those inserts to slide out of engagement with L-shaped heads 174 while inserts 122a and 122c slide into engagement therewith.

Once cylinder 140 has completed its extension stroke, inserts 122a and 122c are beneath the mold cavities and in position to be shifted upwardly, label attached, by cylinders 170. Inserts 122b and 122d are now at labeling stations 34b and 36b. Label transfer assemblies 60c and 60d are activated to place labels thereon in the manner previously described.

Label bearing inserts 122a and 122c are shifted upwardly into mold cavities 116. The mold sections are moved by the platens to the extrusion station and the molds closed about the parisons as soon as required clearance for label transfer assemblies 60c and 60d has been achieved. Note that much if not all of the carriage shifting, insert insertion and label placement can take place during the time period in which the platens are moving from the calibration to the extrusion station.

When the mold sections are closed about the parisons, the molds are again moved to the calibration station and the parisons blown. The resulting containers will bear the labels carried into the cavities 116 by label carrying inserts 122a and 122c. When the mold sections open and the containers are removed, cylinders 170 retract, returning inserts 122a and 122c to carriage 121. Cylinder 140 is then retracted again, bringing label bearing inserts 122b and 122d into registry with mold cavities 116. These inserts are moved into the cavities, labels placed on inserts 122a and 122c, and the foregoing process continuously repeated.

EMBODIMENT OF FIG. 9

Another embodiment of the label transferring device is shown in FIG. 9. This label transferring device is generally similar to that shown in FIGS. 1-4, with the exception that transfer arm assemblies 260 and 260a are not mounted on platen 10 but rather on the frame of the blow molding machine at the calibration station. This embodiment is particularly well suited to transferring long or tall labels which require label supply magazines 290 and 290a that are too large to mount on platen 10 beneath the mold sections.

As shown in FIG. 9, the label transferring device includes two spaced transfer arm assemblies 260 and 260a which are mounted by a pair of brackets 266, 266a on a frame 206 which is also used to mount a blow pin 204 of the machine. Hydraulic cylinders 270, 270a each have an elongated piston rod 264, 264a which extends downward toward platen 10c when at the calibration station. Piston rod 264 has a placement cylinder 270 mounted on its free end and also has a pair of spaced, elongated guide rods 265 which are mounted along opposite sides of cylinder 270 by a pair of brackets 273. Each placement cylinder 270 is a small, double-acting hydraulic cylinder which has a rod that extends a vacuum head of the type described above toward either label magazines 292 or inserts 222, whichever of the two elements cylinders 270 are positioned next to at the time of extension. Such a placement cylinder is described in detail in copending application, entitled Blow Molding Label Transferring Device, Ser. No. 515,033, filed on even date herewith. Guide rods 265 extend parallel to piston rod 264 and pass through bracket 206 to provide additional guidance for extended piston rod 264.

On the outermost guide rod 265 are a pair of adjustable lobes 269 which contact limit switches 268 for control of the machine at the fully extended and fully withdrawn positions. Mounted beneath bracket 206 are a pair of elongated label magazines 290, 290a of the type described above, with the exception that label magazines 290, 290a provide longer labels 292. On platen 10 is a mold section 214 having a mold cavity 216 and sliding insert 222 as described in connection with FIGS. 1-4, with the exception that sliding insert 222 is larger in order to handle elongated labels 292. Insert 222 is shifted by a shifting cylinder 240 which is mounted to one side of mold sections 214.

The label transferring device of FIG. 9 is used to place elongated labels 92 on insert 222 in the same manner as described above for the embodiment of FIGS. 1-4. The only difference is that transfer arm assemblies 260, 260a transfer labels 292 from a stationary support on the frame of the blow molding machine above platen 10 and therefore platen 10 must remain stationary at the calibration station during the label transferring process, and placement cylinders 270, 270a move the labels toward insert 222 rather than the entire transfer arm assemblies 260, 260a being moved.

It is to be understood that the foregoing is merely a description of the preferred embodiments and that various modifications or improvements, such as the use of pneumatic and/or hydraulic cylinders in place of all hydraulic cylinders, could be made by those skilled in the art without departing from the spirit of the invention disclosed herein. The scope of the protection afforded is to be determined by the claims which follow and the breadth of interpretation which the law allows.

The embodiments of the invention in which an exclusive property or privilege is claimed are defined as follows:

1. A label transferring device for container blow molding machines having separable mold sections which define a mold cavity mounted on a pair of spaced, movable platens, said device comprising:
   a mold insert having at least a first and a second label carrying segments, each of said segments being slidable into said cavity to a molding position whereat it closes said cavity and forms a portion of the interior surface of said cavity and slidable out of said cavity to a label loading position whereat a label may be loaded thereon;
   means on each of said segments for receiving and retaining a label and exposing the same to the interior of said cavity when said segment is in the molding postion;
   a label supply and first means for transferring a label to said first segment from said label supply when said first segment is at said loading position, and second means for transferring a label to said second segment from said label supply when said second segment is at said loading position, said second transferring means being separate from said first transferring means; and
   means for alternately shifting said segments between said molding position and said loading position, whereby one of said segments is positioned in said cavity while the other of said segments is simultaneously positioned at said label loading position and said transfer means transfers a label thereto.

2. The device as set forth in claim 1 wherein there are two aligned access openings in said mold communicative with said mold cavity, wherein said insert is a single piece and wherein said insert is reciprocatingly shifted out one of said access openings and then out the other of said access openings and which further comprises one of said label transferring means being positioned at the exterior of said cavity adjacent each of said openings.

3. The device as set forth in claim 2 wherein said platens are movable between different blow molding stations in said machine, and wherein said label transferring means is mounted on one of said platens to be carried therewith.

4. The device as set forth in claim 2 wherein said label transferring means and said label supply are mounted stationary on the frame of said blow molding machine above said platens.

5. The device as set forth in claim 1 wherein said mold sections define at least two mold cavities, wherein each cavity has an access opening to the interior thereof and wherein there are at least four of said label carrying segments and wherein said shifting means shifts at least two of said segments into said molding position through said access openings and at least two of said segments into said label loading position.

6. The device as set forth in claim 5 which further comprises one of said transferring means being positioned adjacent each of said segments when it is in said label loading position.

7. The device as set forth in claim 1 wherein said insert is slidable into a first of said separable mold sections, further comprising another of said label transferring devices as set forth in claim 1 wherein said insert is slidable into a second of said separable mold sections.

8. The device as set forth in claim 7 wherein said platens are movable between different blow molding stations in said machine, and wherein said label transferring device is mounted on said platens so as to be carried therewith.

9. The device as set forth in claim 1 wherein said insert segments are each separable segments slidably and removably mounted on a guide track, and further comprising means for reciprocably moving said segments on said guide track from said label loading position to an insertion position from which at least one of said inserts may be moved into said molding position.

10. The device as set forth in claim 9 further comprising a sliding carriage movably mounted on said guide track, said segments being selectively removably mounted on said carriage, and said carriage having means for moving said carriage on said guide track to reciprocatingly carry said segments between said label loading and insertion positions and for moving said segments from said insertion position off of said carriage into said molding position.

11. The device of claim 10 wherein said transfer means is mounted on one of said platens to be carried therewith.

12. The device as set forth in claim 1, wherein:
said segments are each slidable parallel to the plane of the face of said platen.

13. The device as set forth in claim 1, wherein:
each said transferring means includes a label transfer arm having means for carrying a label thereon, said label transfer arm being extendable between a first position with said carrying means positioned at said label supply and a second position with said carrying means positioned at said segment corresponding to said transferring means, said label supply and said segment being disposed on the same side of said label transfer arm.

14. A label transferring device for container blow molding machines having separable mold sections which define a mold cavity mounted on a pair of spaced, movable platens, said device comprising:
said mold sections defining at least two mold cavities, each said cavity having an access opening to the interior thereof;
a mold insert having at least four label carrying segments, each of said segments being slidable into at least one of said cavities to a molding position whereat it closes said cavity and forms a portion of the interior surface of said cavity and slidable out of said cavity to a label loading position whereat a label may be loaded thereon;
means on each of said segments for receiving and retaining a label and exposing the same to the interior of said cavity when said segment is in the molding position;
a label supply and means for transferring a label to each of said segments from said label supply when said segment is at said loading position, one of said transferring means being positioned adjacent each of said segments when it is in said label loading position;
means for alternately shifting said segments between said molding position and said loading position and for shifting at least two of said segments into said molding position through said access openings and at least two of said segments into said label loading position; and
said insert having at least a first, a second and a third labeling position and at least a first and a second insertion position alternately between said labeling positions, and said shifting means shifting said four label carrying segments reciprocably between a first location wherein said segments occupy said first and second labeling positions and said first and second insertion positions and a second location wherein said segments occupy said second and third labeling positions and said first and second inserting positions, said shifting means further comprising means for inserting the segments occupying said first and second insertion positions into said molding positions.

15. A label transferring device for container blow molding machines having separable mold sections which define a mold cavity mounted on a pair of spaced, movable platens, said device comprising:
said mold sections defining at least two mold cavities, each said cavity having an access opening to the interior thereof;
a mold insert having at least four label carrying segments, each of said segments being slidable into at least one of said cavities to a molding position whereat it closes said cavity and forms a portion of the interior surface of said cavity and slidable out of said cavity to a label loading position whereat a label may be loaded thereon;
means on each of said segments for receiving and retaining a label and exposing the same to the interior of said cavity when said segment is in the molding position;

a label supply and means for transferring a label to each of said segments from said label supply when said segment is at said loading position;

means for alternately shifting said segments between said molding position and said loading position and for shifting at least two of said segments into said molding position through said access openings and at least two of said segments into said label loading position; and said shifting means including means for alternatingly shifting said segments from said label loading position to an insertion position intermediate said label applying position and said molding position, said alternatingly shifting means shifting said segments between three aligned label loading positions and two insertion positions, each of said insertion positions located between two said label loading positions, and three said label transferring means each positioned for loading a segment located at a different one of said loading positions.

16. A label transferring device for container blow molding machines having separable mold sections which define a mold cavity mounted on a pair of spaced, movable platens, said device comprising:

said mold sections defining at least two mold cavities;

a mold insert having at least four label carrying segments, each of said segments being slidable into at least one of said cavities to a molding position whereat it closes said cavity and forms a portion of the interior surface of said cavity and slidable out of said cavity to a label loading position whereat a label may be loaded thereon, said insert segments each being separable segments slidably and removably mounted on a guide track;

means on each of said segments for receiving and retaining a label and exposing the same to the interior of said cavity when said segment is in the molding position;

a label supply and means for transferring a label to each of said segments from said label supply when said segment is at said loading position; and means for alternately shifting said segments between said molding position and said loading position, said alternately shifting means including means for reciprocably moving said segments on said guide track from said label loading position to an insertion position from which at least one of said inserts may be moved into said molding position, said label loading and insertion positions being alternatingly spaced along said guide track with said insertion positions aligned with said molding positions and said label loading positions being misaligned with said molding positions.

17. The device as set forth in claim 16 further comprising three said label transfer means and two means for moving one of said segments from said insertion position into said molding position, said segment moving means each located between two of said label transfer means.

18. A label transferring device for container blow molding machines adapted to blow mold articles with labels affixed to a prescribed surface thereof, said machines having separable mold sections which define a mold cavity mounted on a pair of spaced, movable platens, said device comprising:

a mold insert having at least two label carrying segments, each of said segments being slidable into said cavity to a molding position whereat it closes said cavity and forms a portion of the interior surface of said cavity and slidable out of said cavity to a label loading position whereat a label may be loaded thereon;

means on each of said segments for receiving and retaining a label and exposing the same to the interior of said cavity when said segment is in the molding position;

a label supply and means for transferring a label to each of said segments from said label supply when said segment is at said loading position;

means for alternately shifting said segments between said molding position and said loading position in a plane generally parallel to said prescribed surface area to be formed; and said platens being movable between different blow molding stations in said machine, said label transferring means being mounted on one of said platens to be carried therewith.

19. A label transferring device for container blow molding machines adapted to blow mold articles with labels affixed to a prescribed surface area thereof, said machines having separable mold sections which define a mold cavity mounted on a pair of spaced, movable platens, said device comprising:

a mold insert having at least two label carrying segments, each of said segments being slidable into said cavity to a molding position whereat it closes said cavity and forms a portion of the interior surface of said cavity against which said prescribed surface area is to be molded with label affixed and slidable out of said cavity to a label loading position whereat a label may be loaded thereon;

means on each of said segments for receiving and retaining a label and exposing the same to the interior of said cavity when said segment is in the molding position;

a label supply and means for transferring a label to each of said segments from said label supply when said segment is at said loading position; and means for alternately shifting said segments between said molding position and said loading position in a plane generally parallel to the said prescribed surface area to be formed.

* * * * *

UNITED STATES PATENT AND TRADEMARK OFFICE
CERTIFICATE OF CORRECTION

PATENT NO. : 4,501,548
DATED : February 26, 1985
INVENTOR(S) : Werner F. F. Jahnel It is certified that error appears in the above-identified patent and that said Letters Patent is hereby corrected as shown below:

Column 4, line 22:
"36" should be --26--

Signed and Sealed this

Twenty-seventh Day of August 1985

[SEAL]

*Attest:*

DONALD J. QUIGG

*Attesting Officer*     *Acting Commissioner of Patents and Trademarks*